US010697219B2

(12) United States Patent
Saccomanno et al.

(10) Patent No.: US 10,697,219 B2
(45) Date of Patent: *Jun. 30, 2020

(54) TENSIONERS FOR MOVABLE PARTITION SYSTEMS, MOVABLE PARTITION SYSTEMS INCLUDING SUCH TENSIONERS, AND RELATED METHODS

(71) Applicant: Won-Door Corporation, Salt Lake City, UT (US)

(72) Inventors: Paul Saccomanno, West Valley City, UT (US); William Michael Coleman, Salt Lake City, UT (US)

(73) Assignee: Won-Door Corporation, Salt Lake City, UT (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/676,538

(22) Filed: Aug. 14, 2017

(65) Prior Publication Data
US 2017/0342754 A1    Nov. 30, 2017

Related U.S. Application Data

(63) Continuation of application No. 13/275,541, filed on Oct. 18, 2011, now Pat. No. 9,732,546.

(51) Int. Cl.
*E05D 15/06* (2006.01)
*E05D 15/12* (2006.01)
(Continued)

(52) U.S. Cl.
CPC ............ *E05D 15/12* (2013.01); *E05F 15/643* (2015.01); *E05Y 2201/656* (2013.01);
(Continued)

(58) Field of Classification Search
CPC .. E05D 15/12; E05F 15/643; E05Y 2201/656; E05Y 2201/644;
(Continued)

(56) References Cited

U.S. PATENT DOCUMENTS

721,946 A    3/1903 Foster
4,009,765 A    3/1977 Leskovec et al.
(Continued)

*Primary Examiner* — Katherine W Mitchell
*Assistant Examiner* — Jeremy C Ramsey
(74) *Attorney, Agent, or Firm* — TraskBritt (57) ABSTRACT

Tensioner devices for use with movable partition systems include endplates configured to be mounted on opposing sides or ends of a movable partition. At least one of the endplates includes a bracket configured for attachment to an end of a chain or a belt. The bracket is movable relative to the endplate. The endplate having the bracket also includes an adjustment mechanism located on a common side of the endplate with the bracket, and is operably coupled with the bracket. The adjustment mechanism is configured for adjusting a distance separating the bracket from the endplate. Movable partition systems include such tensioner devices. Methods of adjusting a tension in a chain or a belt of a movable partition system involve the use of such a tensioner device. Methods of installing movable partition systems within structures include the installation of such tensioner devices.

20 Claims, 5 Drawing Sheets

(51) Int. Cl.
*E05F 15/643* (2015.01)
*F16H 7/08* (2006.01)

(52) U.S. Cl.
CPC .......... *E05Y 2201/672* (2013.01); *F16H 7/08* (2013.01); *Y10T 24/2177* (2015.01)

(58) Field of Classification Search
CPC ......... E05Y 2201/658; E05Y 2201/654; F16H 7/08; F16H 2007/0842; F16H 2007/0857; F16H 2007/0891; Y10T 24/2144
See application file for complete search history.

(56) References Cited

U.S. PATENT DOCUMENTS

| | | | |
|---|---|---|---|
| 4,105,221 A | | 8/1978 | Fleming |
| 4,312,426 A | | 1/1982 | McVeen |
| 4,567,627 A | | 2/1986 | Patterson et al. |
| 4,617,703 A | | 10/1986 | Schaeffer |
| 4,834,161 A | | 5/1989 | Johnson et al. |
| 4,924,929 A | | 5/1990 | Johnson et al. |
| 5,297,782 A | * | 3/1994 | Dombrowski ............ F16H 7/08 267/177 |
| 5,638,639 A | | 6/1997 | Goodman et al. |
| 6,662,848 B2 | | 12/2003 | Goodman et al. |
| 7,050,283 B2 | | 5/2006 | Field et al. |
| 7,066,297 B2 | | 6/2006 | Goodman et al. |
| 7,190,132 B2 | | 3/2007 | Goodman et al. |
| 7,220,198 B2 | * | 5/2007 | Iida .................. B23Q 5/34 474/253 |
| 7,478,663 B2 | | 1/2009 | Goodman et al. |
| 7,513,293 B2 | | 4/2009 | Goodman et al. |
| 7,656,129 B2 | | 2/2010 | Banta et al. |
| 7,737,860 B2 | | 6/2010 | Banta et al. |
| 7,740,046 B2 | | 6/2010 | Goodman et al. |
| 7,782,019 B2 | | 8/2010 | Banta et al. |
| 7,845,384 B2 | | 12/2010 | Goodman et al. |
| 7,845,385 B2 | | 12/2010 | Goodman et al. |
| 7,845,386 B2 | | 12/2010 | Coleman et al. |
| 7,854,248 B2 | | 12/2010 | Coleman et al. |
| 7,874,341 B2 | | 1/2011 | Coleman et al. |
| 7,886,804 B2 | | 2/2011 | Goodman et al. |
| 7,926,538 B2 | | 4/2011 | Coleman et al. |
| 7,931,067 B2 | | 4/2011 | Goodman et al. |
| 2008/0115896 A1 | | 5/2008 | Goodman |
| 2010/0056311 A1 | | 3/2010 | Kondash et al. |
| 2010/0102764 A1 | | 4/2010 | Banta et al. |
| 2010/0214709 A1 | | 8/2010 | Hall et al. |
| 2010/0299889 A1 | | 12/2010 | George |
| 2011/0000625 A1 | | 1/2011 | George |
| 2011/0005689 A1 | | 1/2011 | Coleman et al. |
| 2011/0024061 A1 | | 2/2011 | Bell et al. |
| 2011/0036016 A1 | | 2/2011 | Knight et al. |
| 2011/0036509 A1 | | 2/2011 | Goodman et al. |
| 2011/0036513 A1 | | 2/2011 | Banta et al. |
| 2011/0061820 A1 | | 3/2011 | Coleman et al. |
| 2011/0088322 A1 | | 4/2011 | Coleman et al. |
| 2011/0093095 A1 | | 4/2011 | Goodman et al. |
| 2011/0186249 A1 | | 8/2011 | Coleman et al. |
| 2011/0203746 A1 | | 8/2011 | Smart |
| 2011/0247275 A1 | | 10/2011 | Coleman et al. |
| 2011/0247764 A1 | | 10/2011 | Coleman et al. |

* cited by examiner

TENSIONERS FOR MOVABLE PARTITION SYSTEMS, MOVABLE PARTITION SYSTEMS INCLUDING SUCH TENSIONERS, AND RELATED METHODS

CROSS-REFERENCE TO RELATED APPLICATION

This application is a continuation of U.S. patent application Ser. No. 13/275,541, filed Oct. 18, 2011, now U.S. Pat. No. 9,732,546, issued Aug. 15, 2017 the disclosure of which is hereby incorporated herein in its entirety by this reference.

TECHNICAL FIELD

Embodiments of the disclosure generally relate to chain tensioner devices usable to adjust a tension in a chain or belt of a movable partition system, to movable partition systems including such chain tensioner devices, and to methods of fabricating, installing, and using such chain tensioner devices and movable partition systems.

BACKGROUND

Movable partitions are utilized in numerous situations and environments for a variety of purposes. Such partitions may include, for example, a movable partition comprising foldable or collapsible doors configured to enclose or subdivide a room or other area. Often such partitions may be utilized simply for purposes of versatility in being able to subdivide a single large room into multiple smaller rooms. The subdivision of a larger area may be desired, for example, to accommodate multiple groups or meetings simultaneously. In other applications, such partitions may be utilized for noise control depending, for example, on the activities taking place in a given room or portion thereof.

Movable partitions may also be used to provide a security barrier, a fire barrier, or both a security barrier and a fire barrier. In such a case, the partition barrier may be configured to automatically close upon the occurrence of a predetermined event such as the actuation of an associated alarm. For example, one or more accordion or similar folding-type partitions may be used as a security barrier, a fire barrier, or both a security barrier and a fire barrier wherein each partition is formed with a plurality of panels connected to one another in a hinged manner. The hinged connection of the panels enables the partition to fold and collapse into a compact unit for purposes of storage when not deployed. The partition may be stored in a pocket formed in the wall of a building when in a retracted or folded state. When the partition is deployed to subdivide a single large room into multiple smaller rooms, secure an area during a fire, or for any other reason, the partition may be extended along an overhead track, which is often located above the movable partition in a header assembly, until the partition extends a desired distance across the room.

When deployed, a leading end of the movable partition, often defined by a component known as a lead post, complementarily engages another structure, such as a wall, a post, or a lead post of another door.

Automatic extension and retraction of the movable partition may be accomplished through the use of a motor. A drive shaft of the motor may be operatively coupled to a sprocket, which may engage a chain that extends through a channel in the track.

In some systems, the motor is located in a fixed position relative to the building, and the chain comprises a loop. Operation of the motor and rotation of the sprocket causes the chain to circulate within the channel in the track. A leading end of the movable partition may be coupled to the chain, such that circulation of the chain causes extension or retraction of the movable partition, depending upon the direction of the circulation of the chain.

In additional systems, the motor may be mounted to a leading end of the movable partition, and the chain may comprise a generally linear chain having fixed ends. In such systems, as the motor drives rotation of the sprocket, the motor and the leading end of the movable partition to which it is attached move along the fixed chain to extend or retract the movable partition.

Improper tension in the chain of the movable partition system can result in malfunction of the system. For example, if the chain is too loose, the sprocket may not properly engage the chain. If the chain is too tight, components of the chain may fail due to excessive stress.

BRIEF DESCRIPTION OF THE DRAWINGS

While the specification concludes with claims particularly pointing out and distinctly claiming what are regarded as embodiments of the present invention, the advantages of embodiments of the invention may be more readily ascertained from the following description of certain example embodiments of the invention when read in conjunction with the accompanying drawings in which:

DETAILED DESCRIPTION

Illustrations presented herein are not meant to be actual views of any particular movable partition system, or component of a movable partition system, but are merely idealized representations that are employed to describe embodiments of the present invention. Additionally, elements common between figures may retain the same numerical designation.

As used herein, the term "substantially" means to a degree that one skilled in the art would understand that the given parameter, property, or condition is met with a small degree of variance, such as within acceptable manufacturing tolerances.

As used herein, relational terms, such as "first," "second," "vertical," "horizontal," etc., describe elements when viewed from the perspectives shown in the figures and do not connote or depend on any specific preference, orientation, or order, except where the context clearly indicates otherwise.

As used herein when referring to a component or to movement of a component, the terms "longitudinal" and "longitudinally" refer to a direction at least substantially parallel to a length of the component. In other words, a member configured to slide "longitudinally" along a rod is configured to slide in a direction at least substantially parallel to a length of the rod.

Figure 1:
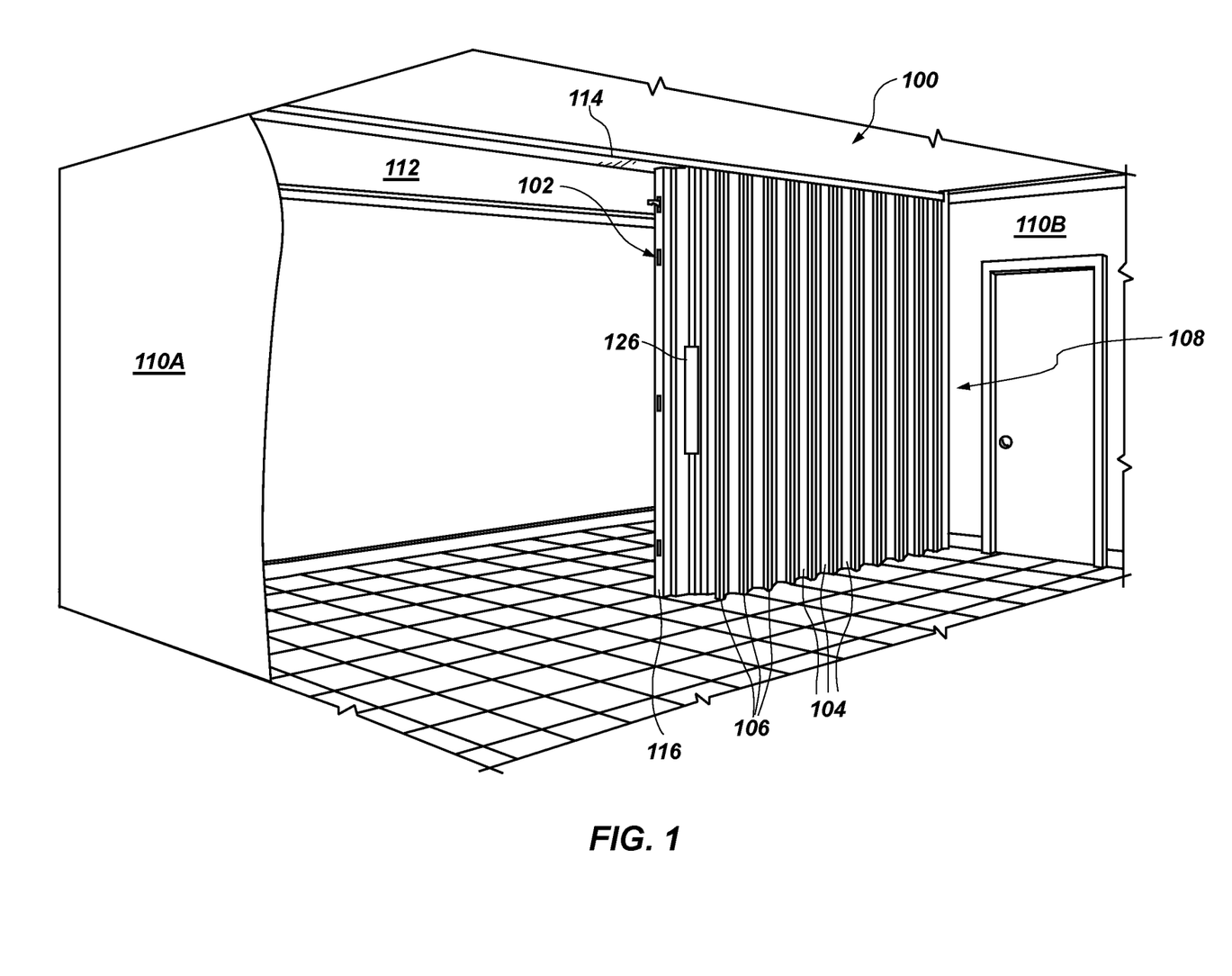
FIG. 1 is a perspective view of an embodiment of a movable partition system of the present disclosure.

FIG. 1 illustrates an embodiment of a movable partition system 100 of the present disclosure. The movable partition system 100 may be an automatic movable partition system, in that the movable partition system 100 includes a movable partition 102 that may be automatically extended, automatically retracted, or both automatically extended and automatically retracted. In some embodiments, the movable partition 102 also may be manually extended and/or retracted if desired. The movable partition 102 may be used for partitioning space, as a sound bather, as a fire barrier, as a security barrier, for combinations of such purposes, or for other purposes. The space to be partitioned by the movable partition 102 may be defined at least partially by a first vertical surface 110A (e.g., a wall), a second vertical surface 110B, and a horizontal surface 112 (e.g., a ceiling, a floor, a header) extending between the first and second vertical surfaces 110A and 110B, respectively.

The movable partition 102 may comprise, for example, an accordion-type door, as shown in FIG. 1. The movable partition 102 may be formed with a plurality of panels 104 that are connected to one another. For example, in some embodiments, the panels 104 may be connected together with hinges or other hinge-like members 106. In other embodiments, the panels 104 may be directly coupled to one another in such a manner as to allow the panels 104 to fold in a hinged manner. The hinged connection of the panels 104 enables the panels 104 to fold in an accordion manner and the movable partition 102 to collapse as the movable partition 102 is retracted, which may enable the movable partition 102 to be compactly stored in a pocket 108 formed in the second vertical surface 110B of a structure, such as a building, when in a retracted or folded state.

While embodiments illustrated and described with respect to the drawings of the disclosure are directed to a single accordion folding movable partition 102, other movable partitions may be used. For example, a two-door, or bi-part door, system may be utilized wherein two similarly configured doors extend across a space and join together to form an appropriate barrier. Also, the disclosure is applicable to movable partitions or barriers other than accordion folding doors, such as sliding doors, windows, and screens.

Control of the movement of the movable partition 102 may be accomplished, in some embodiments, by the use of sensors, controls, and a drive mechanism. The movable partition 102, when used as a fire door, for example, may include a switch or actuator 126, commonly referred to as "panic hardware." Actuation of the panic hardware 126 enables a person located on one side of the movable partition 102 to cause the door to be opened if it is closed, or to stop movement while it is closing, enabling egress through the barrier formed by the door as needed. Controls may also be located in other locations (e.g., remotely) and may be configured to extend or retract the movable partition 102 manually or automatically, such as when a fire alarm activates, at a certain time or date, or when other conditions are met.

The movable partition 102 may be coupled to (e.g., hang from) a track 114 mounted to a horizontal surface 112 along which the movable partition 102 moves as the movable partition 102 is expanded (i.e., closed) and retracted (i.e., opened). To deploy the movable partition 102 to an extended position, the movable partition 102 is moved along the track 114.

Figure 2:
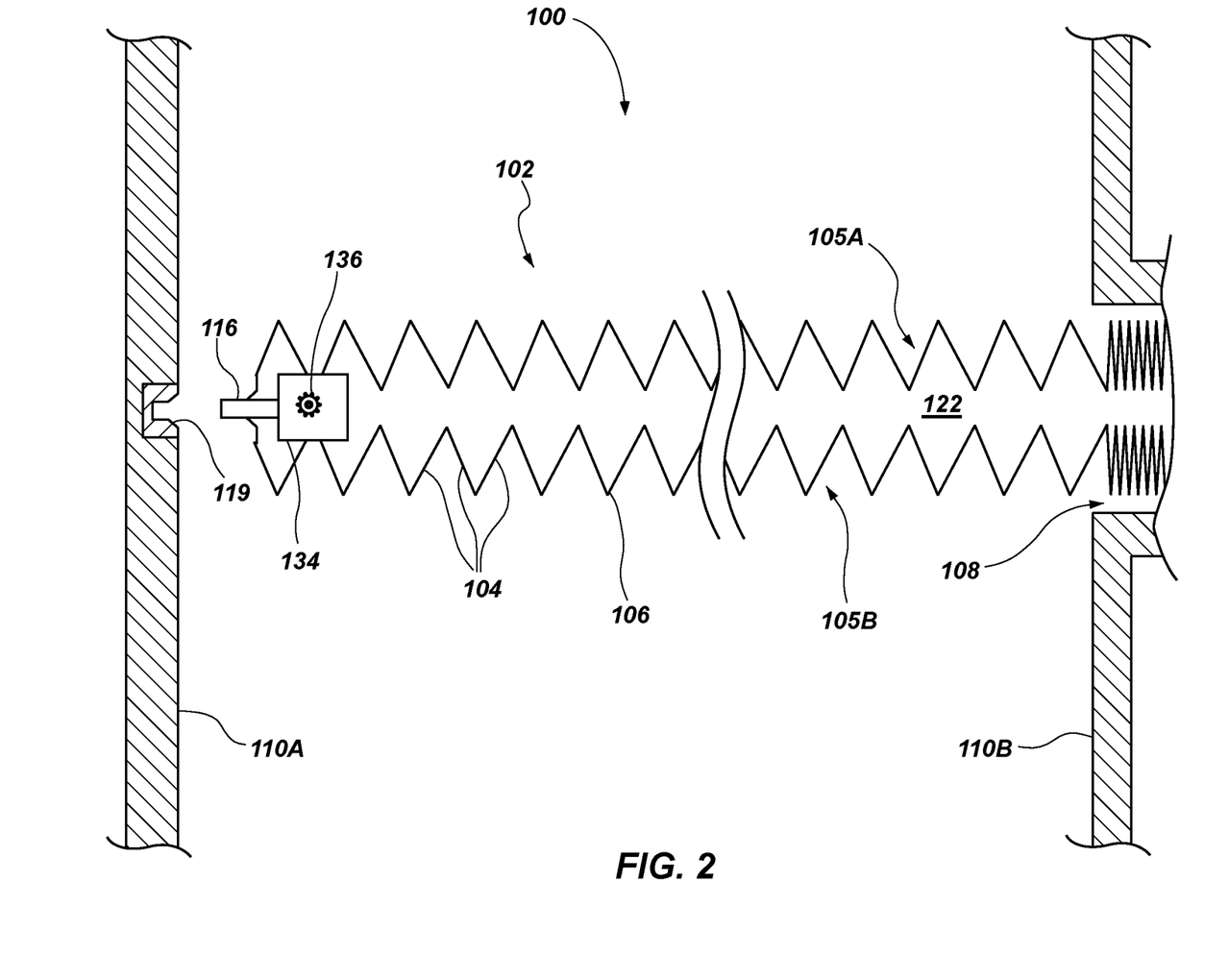
FIG. 2 is a simplified top view illustrating some components of the movable partition system of FIG. 1.

FIG. 2 illustrates a simplified top view of a movable partition system 100. A leading end of the movable partition 102, shown as a lead post 116, matingly (i.e., complementarily) engages with a jamb 119 or door post that may be formed in the first vertical surface 110A of a structure (or on a leading end of another complementary partition), when the movable partition 102 is in a deployed or an extended state. In some embodiments (not shown), the jamb 119 may be flat or a flat portion of the first vertical surface 110A and the lead post 116 may be flat for abutting against the flat jamb 119 or flat portion of the first vertical surface 110A.

A movable partition 102 may include, by way of non-limiting example, a first sheet 105A of panels 104 and a second sheet 105B of panels 104 that is laterally spaced from the first sheet 105A of the panels 104. Such a configuration may be used as a fire door wherein the first sheet 105A acts as a primary fire and smoke barrier, the space 122 between the first sheet 105A and the second sheet 105B acts as an insulator or a buffer zone, and the second sheet 105B acts as a secondary fire and smoke barrier. Such a configuration may also be useful as an acoustical barrier when the movable partition 102 is used to subdivide a space into multiple rooms.

The movable partition 102 may include a motor assembly 134 for driving the movable partition 102 across a space. By way of example, the motor assembly 134 may include a motor (not shown) and a rotatable drive member 136 (e.g., a sprocket, a gear, a toothed wheel) configured to be driven by the motor. The motor may be carried by the movable partition 102, such as within the space 122 between the first and second sheets 105A and 105B. The rotatable drive member 136 may be configured to be complementary to and engaged with a chain 130 (e.g., a roller chain) (see FIGS. 3 & 4). Furthermore, the motor assembly 134 may be coupled with the movable partition 102 in such a manner that rotation of the rotatable drive member 136 engaged with the chain 130 causes at least a portion of the movable partition 102 to move across the space. By way of example and not limitation, the motor assembly 134 may be rigidly attached to a leading end of the movable partition 102, such as at or near the lead post 116.

Figure 3:
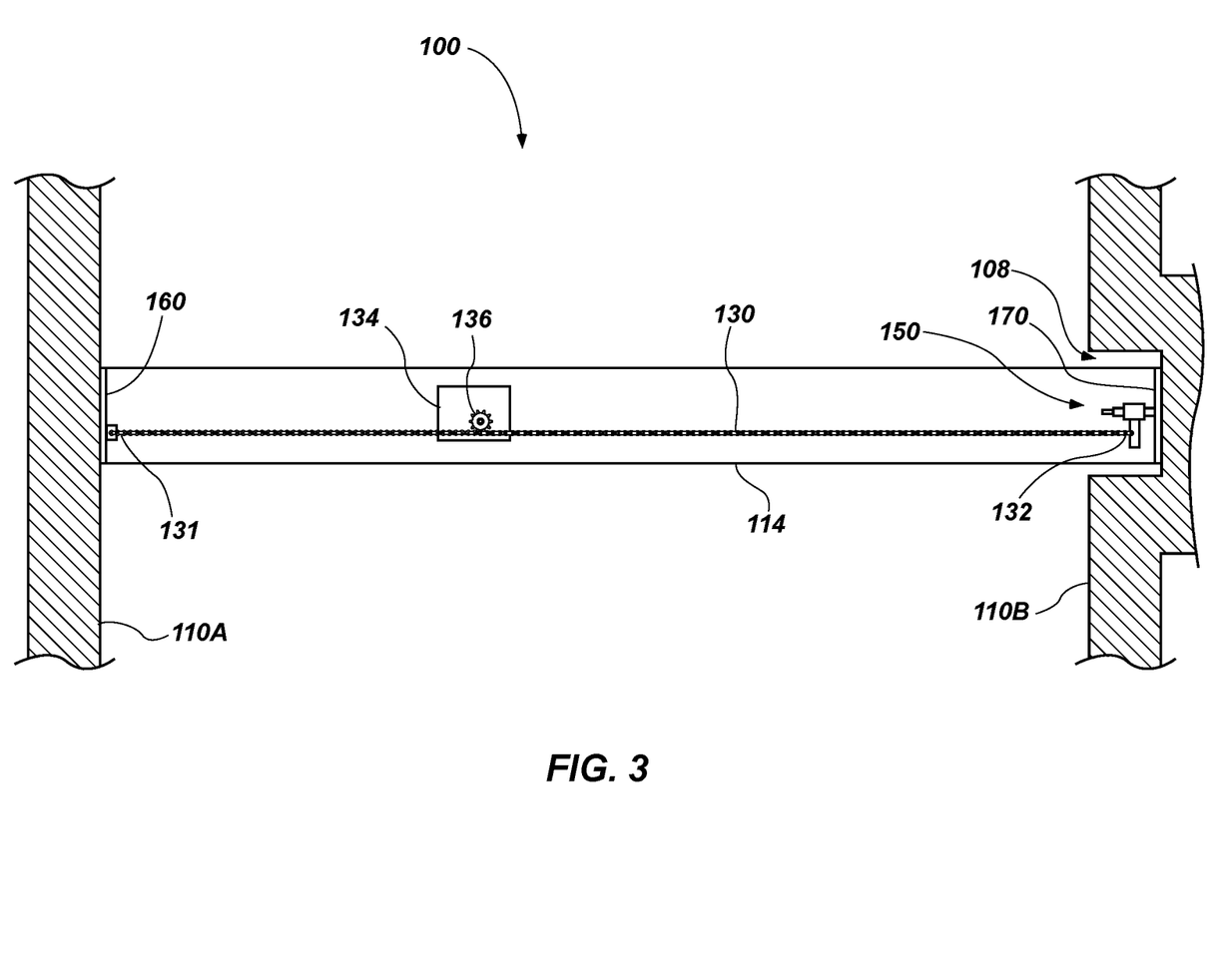
FIG. 3 is a simplified top view similar to FIG. 2 illustrating an embodiment of a chain tensioner device of the movable partition system of FIG. 1.

FIG. 3 is a simplified top plan view similar to that of FIG. 2 illustrating an embodiment of certain components of the movable partition system 100. Referring to FIG. 3 in conjunction with FIG. 2, the movable partition system 100 of the present disclosure may include a chain tensioner device 150 for tightening or loosening a chain 130 (e.g., a roller chain) or other elongated drive member (e.g., a belt, a toothed belt, etc.). The chain tensioner device 150 may include a first endplate 160 positioned at or near the first vertical surface 110A and a second endplate 170 positioned at or near the second vertical surface 110B. For example, the second endplate 170 may be positioned within the pocket 108 formed in the second vertical surface 110B. The chain 130 may be fixed at a first end 131 to the first endplate 160 of the chain tensioner device 150 and at a second end 132 to the second endplate 170 of the chain tensioner device 150.

Although FIG. 3 illustrates the second endplate 170 of the chain tensioner device 150 located in the pocket 108 of the second vertical surface 110B, the disclosure is not so limited. For example, the chain tensioner device 150 may be installed in an opposite orientation. In other words, the first endplate 160 of the chain tensioner device 150 may be positioned at or near the second vertical surface 110B and the second endplate 170 of the chain tensioner device 150 may be positioned at or near the first vertical surface 110A.

The chain 130 and the rotatable drive member 136 may have complementary features such that rotation of the rotatable drive member 136 forces the movable partition 102 (see FIG. 2) in a desired direction. To extend the movable partition 102, the rotatable drive member 136 may be rotated and the leading edge of the movable partition 102 may proceed along the track 114, thus driving the motor assembly 134 and, consequently, the movable partition 102 (or a portion thereof) across the space. To retract the movable partition 102, the rotatable drive member 136 may be rotated in the opposite direction, forcing the movable partition 102 to proceed along the track 114 in the opposite direction. When the movable partition 102 is retracted, it may be stored at least partially in the pocket 108 in the second vertical surface 110B.

Figure 4:
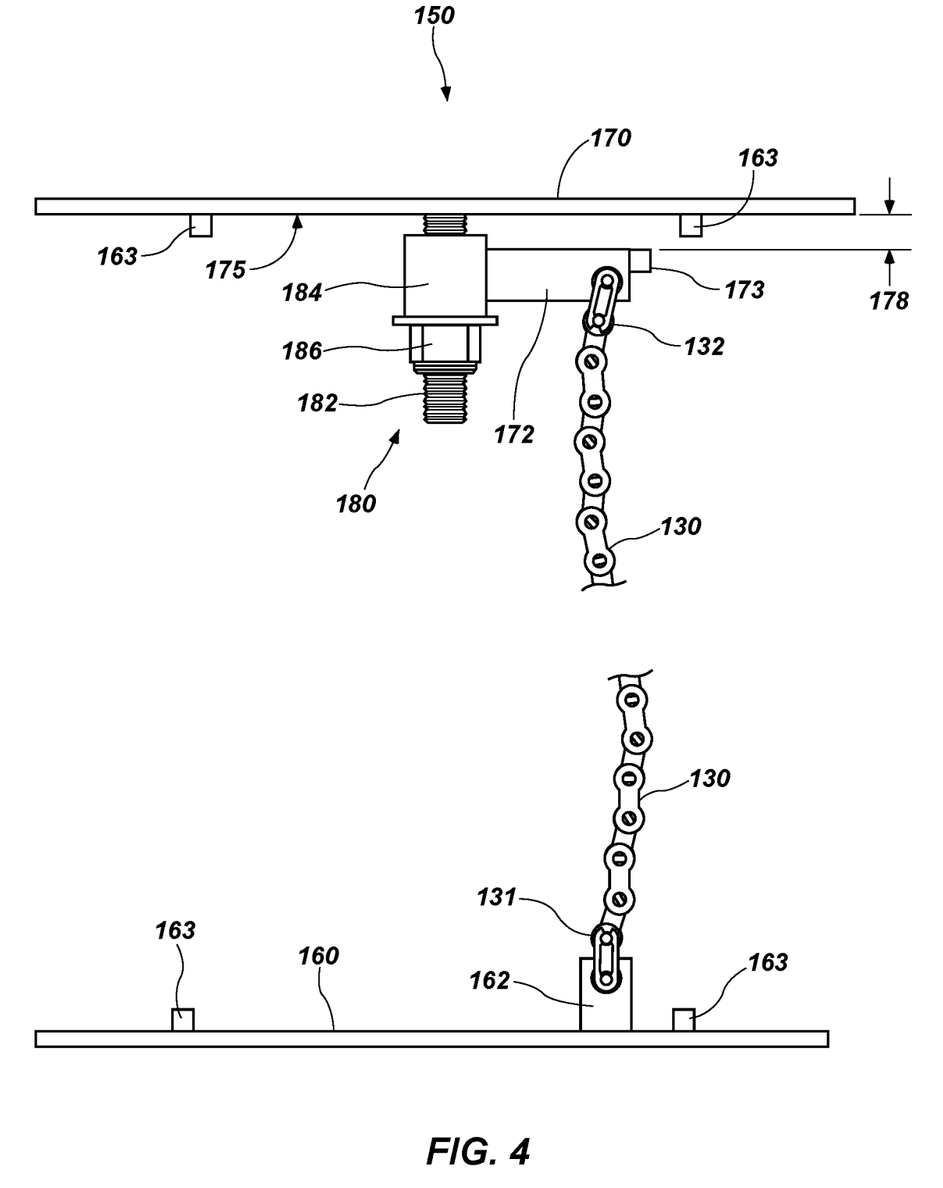
FIG. 4 is a top plan view showing in detail the chain tensioner device of FIG. 3.

FIG. 4 illustrates an embodiment of a chain tensioner device 150 of the present disclosure. The chain tensioner device 150 may include a first endplate 160 including a first bracket 162 configured to secure the chain 130 to the first endplate 160. By way of example and not limitation, the first bracket 162 may include a hole or a notch in which a first end 131 of the chain 130 or a chain connecting member (e.g., a so-called "master link") may be at least partially disposed. The first endplate 160 may have at least one endplate guide block 163 coupled thereto to assist in installing and aligning the first endplate 160 with the track 114, as will be described in more detail below.

The first endplate 160 may optionally include one or more fasteners (not shown) for installing the first endplate 160 in a movable partition system 100 proximate (e.g., against) the first vertical surface 110A (see FIG. 3). By way of example and not limitation, the one or more fasteners may include at least one of a screw, a bolt, a nail, a weld, and an adhesive. As will be appreciated by one skilled in the art, the first endplate 160 and its components may be formed of any suitably rigid material, such as at least one of metal, plastic, ceramic, wood, etc.

Figure 5:
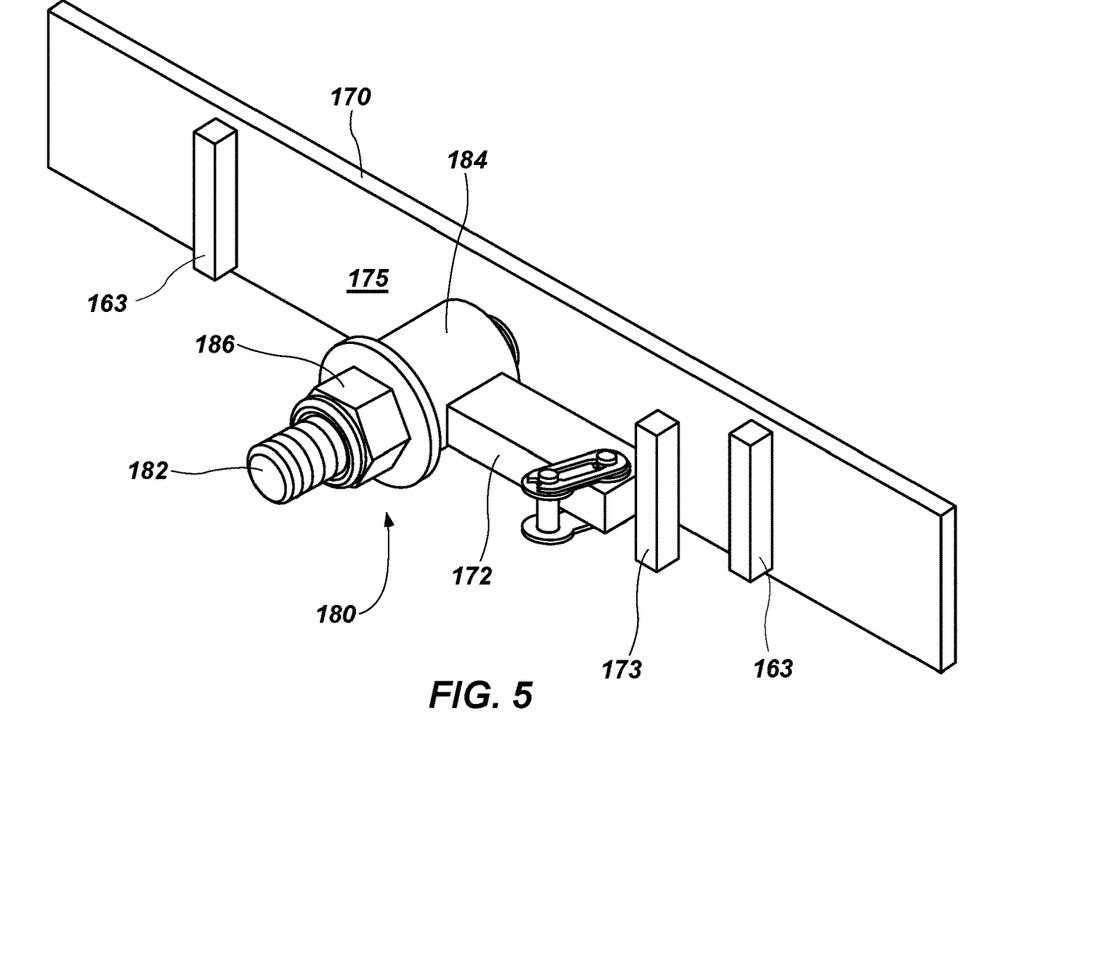
FIG. 5 is a perspective view showing certain components of the chain tensioner device of FIG. 4.

Referring to FIG. 4 in conjunction with FIG. 5, the chain tensioner device 150 may also include a second endplate 170. The second endplate 170 may include a second bracket 172 configured to secure the chain 130 to the second endplate 170. By way of example and not limitation, the second bracket 172 may include a hole or a notch in which a second end 132 of the chain 130 or a chain connecting member may be disposed. The second endplate 170 may optionally include one or more fasteners (not shown) for installing the second endplate 170 in a movable partition system 100 proximate (e.g., against) the second vertical surface 110B (see FIG. 3). The second endplate 170 may have at least one endplate guide block 163 coupled thereto to assist in installing and aligning the second endplate 170 with the track 114, as will be described in more detail below.

The second endplate 170 may also include an adjustment mechanism 180 for adjusting tension in the chain 130. The adjustment mechanism 180 may be located on a first side 175 of the second endplate 170 facing the space to be partitioned by the movable partition 102 and opposite the second vertical surface 110B. The adjustment mechanism 180 may include an elongated member 182 (e.g., a rod, a post, a threaded rod) and a carriage member 184. The elongated member 182 of the adjustment mechanism 180 may be coupled to the first side 175 of the second endplate 170. By way of example, the elongated member 182 may extend from the surface of the second endplate 170 on the first side 175 thereof. The carriage member 184 may be mounted on and configured to slide longitudinally along the elongated member 182. By way of example and not limitation, the carriage member 184 may be disposed at least partially around the elongated member 182 and capable of sliding along the elongated member 182 longitudinally. The adjustment mechanism 180 may optionally include a threaded nut 186 engaged with the elongated member 182 and configured to hold the carriage member 184 in place along the elongated member 182 and/or move the carriage member 184 longitudinally along the elongated member 182. As will be appreciated by one skilled in the art, the second endplate 170 and its components may be formed of any suitably rigid material, such as at least one of metal, plastic, ceramic, wood, etc.

The second bracket 172 may be coupled to the adjustment mechanism 180. By way of example, the second bracket 172 may be rigidly coupled to the carriage member 184 of the adjustment mechanism 180 with at least one of a weld, an adhesive, a screw, etc. In some embodiments, the second bracket 172 and the carriage member 184 may be a single unit formed of a unitary body. In other words, the second bracket 172 and the carriage member 184 need not be formed separately and then coupled together. Rather, the present disclosure includes a unitary member that performs the functions of both the second bracket 172 and the carriage member 184.

The second bracket 172 may be separated from the first side 175 of the second endplate 170 by a distance 178. A tension of the chain 130 coupled to the second bracket 172 may be adjusted by manipulating the adjustment mechanism 180 to adjust the distance 178. By way of example and not limitation, the distance 178 may be adjusted by rotating the threaded nut 186 about the elongated member 182. For example, tightening the threaded nut 186 moves it longitudinally along the elongated member 182 to slide the carriage member 184 of the adjustment mechanism 180 longitudinally along the elongated member 182. Consequently, the second bracket 172 coupled to the carriage member 184 may also move longitudinally in relation to the elongated member 182 and the distance 178 between the first side 175 of the second endplate 170 and the second bracket 172 may be decreased. Decreasing the distance 178 may cause more tension in the chain 130 compared to a starting distance 178. Conversely, loosening the threaded nut 186 may enable the carriage member 184 to move longitudinally along the elongated member 182 in an opposite direction responsive to tension in the chain 130, thereby increasing the distance 178 and decreasing the tension in the chain 130. In this manner, tension in the chain 130 may be adjusted by manipulating the adjustment mechanism 180.

Figure 6:
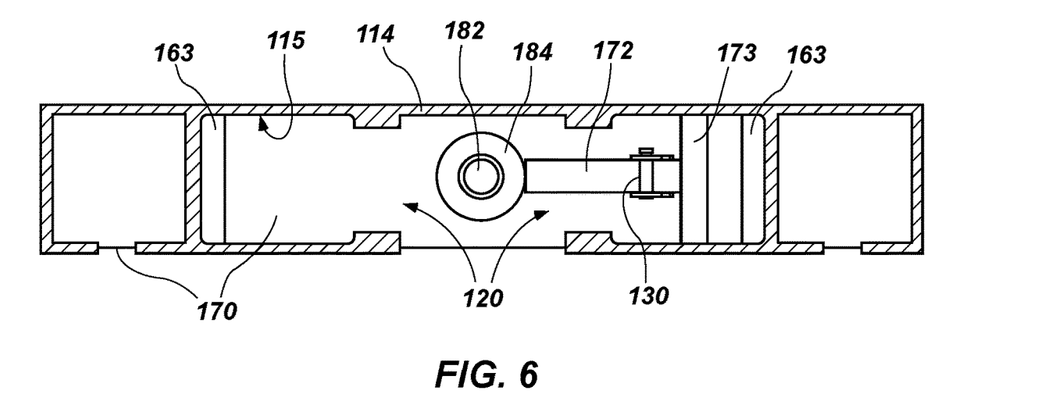
FIG. 6 is a side view showing certain components of the chain tensioner device of FIG. 4 coupled to an embodiment of a track.

Referring to FIG. 4 in conjunction with FIGS. 5 and 6, the second endplate 170 may have at least one endplate guide block 163 coupled thereto. The at least one endplate guide block 163 may be configured to be at least partially disposed within an internal cavity 120 of the track 114. For example, the internal cavity 120 may be a central channel (e.g., a so-called "chain guide") of the track 114, as shown in FIG. 6. The at least one endplate guide block 163 coupled to the second endplate 170 may be configured to abut against at least one internal surface 115 of the track 114. The at least one endplate guide block 163 may be configured to impede or eliminate movement of the second endplate 170 in up-and-down and/or left-and-right directions (when viewed in the perspective shown in FIG. 6) relative to the track 114 coupled thereto.

The first endplate 160 may also have at least one endplate guide block 163 coupled thereto (FIG. 4) that is configured to be disposed at least partially within the track 114 in a manner similar to that shown in FIG. 6.

With continued reference to FIGS. 4 through 6, a bracket guide block 173 may be coupled to the second bracket 172 and configured to impede or eliminate rotation of the second bracket 172 and the carriage member 184 about the elongated member 182. For example, the bracket guide block 173 may be configured to abut against the at least one internal surface 115 of the track 114, such as within the internal cavity 120 of the track 114. The bracket guide block 173 may help maintain alignment of the chain 130 along the track 114. For example, the bracket guide block 173 may counteract a force tending to rotate the carriage member 184 and the second bracket 172 about the elongated member 182. Such a force may be counteracted by abutment of the bracket guide block 173 against the at least one internal surface 115 of the track 114, which may impede or stop rotation of the carriage member 184 and the second bracket 172 about the elongated member 182. Thus, the bracket guide block 173 may help maintain the chain 130 in alignment with the track 114 by keeping the bracket 172 to which the chain 130 is coupled in approximately the same rotational position relative to the elongated member 182. In other words, the position of the first end 131 (FIG. 4) of the chain 130 may be fixed in an up-and-down direction (when viewed in the perspective of FIG. 6) relative to the track 114 by the bracket guide block 173.

The movable partition system 100 of the present disclosure may offer some advantages over prior known movable partition systems. For example, in some prior known movable partition systems, a chain adjustment mechanism is located on a back side of an endplate opposite the space to be partitioned (e.g., a side of the endplate closest to a vertical surface to which the endplate is attached). Adjustment of the tension of a chain may require accessing the adjustment mechanism located on the back side of the endplate. In such prior known configurations, the endplate may have to be removed to access the chain adjustment mechanism, there may be a small space behind the endplate that is difficult to access, or it may be necessary to access the adjustment mechanism from the back side of the vertical surface. On the other hand, the adjustment mechanism 180 of present disclosure may be located on the first side 175 of the second endplate 170 facing the space to be partitioned by the movable partition 102, as described above (see FIGS. 3-6). The movable partition system 100 of the present disclosure may allow a user to avoid working in such a confined space, removing an endplate, or accessing a back side of the second vertical surface 110B to gain access to the adjustment mechanism 180 to adjust tension in the chain 130. Therefore, the movable partition system 100 of the present disclosure including the chain tensioner device 150 may reduce time, effort, and cost involved in installing and maintaining movable partition systems by providing easier access to the adjustment mechanism 180 as compared to prior known configurations.

The present disclosure also includes methods of adjusting a tension in a chain 130 of a movable partition system 100 installed within a structure. In at least some embodiments and with continued reference to FIGS. 3 through 6, an adjustment mechanism 180 located on a first side 175 of an endplate 170 may be manipulated to adjust tension in the chain 130. The endplate 170 may be positioned proximate a vertical surface 110B of the structure. The first side 175 of the endplate 170 may face a space to be partitioned with a movable partition 102 of the movable partition system 100.

The adjustment mechanism 180 may be manipulated by adjusting a distance 178 separating a bracket 172 attached to a second end 132 of the chain 130 and a surface of the endplate 170 on a first side 175 thereof. The distance 178 may be adjusted by, for example, turning a threaded nut 186 about an elongated member 182 coupled to the endplate 170 on the first side 175 thereof. A carriage member 184 may be coupled with the second bracket 172 and slidingly coupled to the elongated member 182. The threaded nut 186 may be located proximate the carriage member 184 on the elongated member 182. Optionally, a washer may be disposed between the threaded nut 186 and the carriage member 184. When the threaded nut 186 is turned about the elongated member 182, the threaded nut 186 may push against the carriage member 184 with greater or lesser force depending on the direction the threaded nut 186 is turned. This greater or lesser force may cause the second bracket 172 coupled to the carriage member 184 to move toward or away from the endplate 170, thus adjusting the distance 178 between the second bracket 172 and the surface of the endplate 170.

Tension in the chain 130 may be adjusted responsive to the manipulation of the adjustment mechanism 180. The first end 131 of the chain 130 may be attached (e.g., fixed) to another bracket 162 on another endplate 160 positioned proximate another vertical surface 110A of the structure. The another bracket 162 may be on a side of the another endplate 160 facing the space to be partitioned with the movable partition 102 of the movable partition system 100. With the first end 131 of the chain 130 attached to the another endplate 160 by the another bracket 162, the movement of the second end 132 of the chain 130 responsive to the manipulating the adjustment mechanism 180 may cause the tension in the chain 130 to be adjusted.

The present disclosure also includes methods of installing a movable partition system 100 within a structure (e.g., a building). With continued reference to FIGS. 1-6, the method may include installing a movable partition system 100 in a space defined at least partially by two vertical surfaces 110A and 110B and at least one horizontal surface 112 extending between the two vertical surfaces 110A and 110B. For example, the space in which the movable partition system 100 is installed may be between the two vertical surfaces 110A and 110B and the at least one horizontal surface 112 extending between the two vertical surfaces 110A and 110B.

In accordance with the method of installing movable partition system 100 within a structure, a track 114 may be mounted to the at least one horizontal surface 112. A movable partition 102 may be coupled to the track 114 such that the movable partition 102 is capable of extending and/or retracting across the space. A chain tensioner device 150 may be installed within the structure. A first end 131 of a chain 130 may be attached to a first endplate 160 of the chain tensioner device 150 and a second end 132 of the chain 130 may be attached to a second endplate 170 of the chain tensioner device 150. A tension in the chain 130 may be adjusted by manipulating an adjustment mechanism 180 of the chain tensioner device 150.

Installing the chain tensioner device 150 within the structure may include mounting a first endplate 160 to the structure proximate a first vertical surface 110A. The first endplate 160 may include a first bracket 162 configured for attaching a chain 130 thereto. A second endplate 170 may be mounted to the structure proximate a second vertical surface 110B. The second endplate 170 may include a second bracket 172 configured for attaching a chain 130 thereto located on a first side 175 of the second endplate 170 opposite the second vertical surface 110B. The second bracket 172 and a surface of the second endplate 170 on the first side 175 thereof may be separated by a distance 178.

The second bracket 172 may be movable relative to the first side 175 of the second endplate 170. The second endplate 170 may further include an adjustment mechanism 180 located on the first side 175 of the second endplate 170. The adjustment mechanism 180 may be operably coupled with the second bracket 172 and configured for adjusting the distance 178 separating the second bracket 172 and the surface of the second endplate 170 on the first side 175 thereof. The adjustment mechanism 180 may include a carriage member 184 coupled with the second endplate 170 by an elongated member 182.

The adjustment mechanism 180 of the chain tensioner device 150 may be manipulated by adjusting the distance 178 separating the second bracket 172 and the surface of the second endplate 170 on a first side 175 thereof. The distance 178 may be adjusted by moving the carriage member 184 coupled with the second endplate 170 by the elongated member 182 longitudinally along the elongated member 182. In some embodiments, the manipulation of the adjustment mechanism 180 may be accomplished by rotating (e.g., tightening or loosening) a threaded nut 186 about the elongated member 182. In such embodiments, the threaded nut 186 may be tightened to push against the carriage member 184, causing the carriage member 184 to slide along the elongated member 182 closer to the first side 175 of the second endplate 170. Consequently, the second bracket 172 coupled to the carriage member 184 may also move closer to the first side 175 of the second endplate 170, decreasing the distance 178. Such movement may also cause the chain 130 to be extended, increasing the tension therein. Conversely, the threaded nut 186 may be loosened to relieve some pressure against the carriage member 184. The tension in the chain 130 may pull the second bracket 172 and the carriage member 184 coupled thereto away from the first side 175 of the second endplate 170, increasing the distance 178 and decreasing the tension in the chain 130. Manipulating the adjustment mechanism 180 in this manner may, therefore, adjust the tension in the chain 130.

CONCLUSION

In some embodiments, the present disclosure includes chain tensioner devices comprising a chain, a first endplate configured for attachment to a first end of the chain, and a second endplate having a bracket configured for attachment to an opposite second end of the chain. The bracket is located on a first side of the second endplate and separated a distance from a surface of the second endplate on the first side of the second endplate, and the bracket is movable relative to the first side of the second endplate. The second endplate also includes an adjustment mechanism located on the first side of the second endplate and operably coupled with the bracket. The adjustment mechanism is configured for adjusting the distance separating the bracket from the surface of the second endplate on the first side thereof.

In additional embodiments, the present disclosure includes movable partition systems that include such chain tensioner devices. The movable partition systems may be configured for installation within a structure, such as a building, in a space defined between two vertical surfaces (e.g., walls) and at least one horizontal surface (e.g., a ceiling and/or a floor) extending between the two vertical surfaces. The movable partition systems may comprise a track configured to be mounted to the at least one horizontal surface, a movable partition configured to be coupled to the track and to extend and retract across the space along the track, a chain configured to extend along the track, and a chain tensioner device as described herein. The chain tensioner device may be used to selectively adjust a tension in the chain when the chain is installed for use. For example, the chain tensioner device may include a first endplate having a first bracket configured for attachment to a first end of the chain, and a second endplate having a second bracket configured for attachment to an opposite, second end of the chain. The second bracket is located on a first side of the second endplate configured to face the space and separated a distance from a surface of the second endplate on the first side of the second endplate, and the second bracket is movable relative to the first side of the second endplate. The second endplate also includes an adjustment mechanism located on the first side of the second endplate and operably coupled with the second bracket. The adjustment mechanism is configured for adjusting the distance separating the second bracket from the surface of the second endplate on the first side thereof. The movable partition systems may further include a motor for driving movement of at least a portion of the movable partition along the track using the chain to cause extension and retraction of the movable partition.

In yet further embodiments, the present disclosure includes methods of using chain tensioner devices as described herein. For example, tension in a chain of a movable partition system installed within a structure may be adjusted by manipulating an adjustment mechanism located on a first side of an endplate positioned proximate a vertical surface of the structure and facing a space to be partitioned by a movable partition of the movable partition system. Manipulating the adjustment mechanism may include adjusting a distance separating a bracket attached to an end of the chain and a surface of the endplate on the first side thereof. Another end of the chain may be attached to another bracket on another endplate facing the space to be partitioned and positioned proximate another vertical surface, such that the tension in the chain is adjusted responsive to the manipulation of the adjustment mechanism.

In yet further embodiments, the present disclosure includes methods of installing a movable partition system including a chain tensioner device as described herein within a building or other structure. For example, a track may be mounted to at least one horizontal surface in the building. A movable partition may be coupled to the track such that the movable partition is capable of extending and retracting across a space within the building along the track. A chain tensioner device may be installed within the building. Installation of the chain tensioner device may be carried out by mounting a first endplate to the building proximate a first vertical surface of the building (e.g., a wall of the building), and mounting a second endplate to the building proximate a second vertical surface of the building (e.g., another wall of the building). The first endplate may comprise a first bracket. The second endplate may comprise a second bracket located on a first side of the second endplate opposite the second vertical surface and separated a distance from a surface of the second endplate on the first side of the second endplate. The second bracket may be movable relative to the first side of the second endplate. The second endplate may further comprise an adjustment mechanism located on the first side of the second endplate and operably coupled with the second bracket. The adjustment mechanism may be configured for adjusting the distance separating the second bracket from the surface of the second endplate on the first side thereof. A first end of a chain may be attached to the first bracket of the first endplate, and a second end of the chain may be attached to the second bracket of the second endplate. A tension in the chain then may be adjusted by manipulating the adjustment mechanism and adjusting the distance separating the second bracket from the surface of the second endplate on the first side thereof.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, combinations, and alternatives falling within the scope of the invention as defined by the following appended claims and their legal equivalents. For example, any of the elements and features disclosed in relation to one embodiment may be combined with one or more of the elements and features disclosed in relation to another embodiment to provide yet further embodiments of the invention.

What is claimed is:

1. A tensioner device for adjusting a tension in a chain or a belt of a movable partition system, comprising:
   a first endplate configured to attach to a first end of a chain or a belt; and
   a second endplate configured to attach to a second, opposite end of the chain or the belt, the second endplate comprising:
      a bracket configured to attach to the second, opposite end of the chain or the belt;
      an adjustment mechanism located on the second endplate and operably coupled with the bracket, the adjustment mechanism comprising an elongated rod extending from a surface of the second endplate on a front side thereof and a carriage member mounted on the elongated rod; and
      a bracket guide block directly coupled to the bracket, wherein the bracket guide block is configured to abut directly against an interior surface of a track within an internal cavity of the track of the movable partition system.

2. The tensioner device of claim 1, wherein the bracket is located on the front side of the second endplate and separated a distance from the surface of the second endplate on the front side thereof.

3. The tensioner device of claim 2, wherein the adjustment mechanism is located within the internal cavity of the track and is configured to adjust the distance separating the bracket from the surface of the second endplate on the front side thereof.

4. The tensioner device of claim 2,
   wherein the carriage member is disposed at least partially around the elongated rod, the carriage member being configured to slide longitudinally along the elongated rod.

5. The tensioner device of claim 4, wherein the bracket is integrally formed with or rigidly attached to the carriage member.

6. The tensioner device of claim 4, wherein the bracket guide block is configured to impede rotation of the bracket about the elongated rod of the adjustment mechanism by abutting directly against the interior surface of the track.

7. The tensioner device of claim 4, wherein the elongated rod comprises a threaded rod, the carriage member being configured to slide longitudinally along the threaded rod using a threaded nut engaged with the threaded rod.

8. The tensioner device of claim 7, wherein the threaded nut is configured to push against the carriage member to cause the carriage member to move closer to the surface of the second endplate on the front side thereof to increase tension in the chain or the belt.

9. The tensioner device of claim 2, wherein the second endplate further comprises at least one member extending from the surface of the second endplate on the front side thereof, the at least one member configured to impede movement of the second endplate relative to the track of the movable partition system.

10. A movable partition system comprising:
    a track;
    a movable partition configured to be coupled to the track;
    a chain or a belt configured to extend along the track; and
    a tensioner device operably coupled to the chain or the belt, the tensioner device comprising:
       a first endplate configured to attach to a first end of the chain or the belt; and
       a second endplate configured to attach to a second, opposite end of the chain or the belt, the second endplate comprising:
          a bracket attached to the second, opposite end of the chain or the belt, the bracket located on a front side of the second endplate facing a space to be partitioned and separated a distance from a surface of the second endplate on the front side thereof;
          an adjustment mechanism comprising an elongated rod extending from the surface of the second endplate on the front side thereof and a carriage member mounted on the elongated rod, the adjustment mechanism being operably coupled with the bracket and configured to adjust a distance separating the bracket from the surface of the second endplate on the front side thereof; and
          a bracket guide block coupled to the bracket and abutting directly against an interior surface of the track within an internal cavity of the track of the movable partition system.

11. The movable partition system of claim 10, further comprising a motor assembly including a motor configured to drive movement of at least a portion of the movable partition along the track using the chain or the belt.

12. The movable partition system of claim 11, wherein the motor assembly further comprises a rotatable drive member engaging the chain or the belt and configured to be driven by the motor.

13. The movable partition system of claim 10, wherein the first endplate is positioned to locate at least a portion of the chain or the belt within the track of the movable partition system.

14. The movable partition system of claim 10, wherein the chain or the belt is offset from the adjustment mechanism when the second, opposite end of the chain or the belt is attached to the bracket.

15. The movable partition system of claim 10, wherein the bracket is movable relative to the front side of the second endplate.

16. The movable partition system of claim 10,
    wherein the carriage member is disposed at least partially around the elongated rod, the carriage member being configured to slide longitudinally along the elongated rod, and the bracket being integrally formed with or rigidly attached to the carriage member.

17. A method of adjusting a tension in a chain or a belt of a movable partition system, the method comprising:
    attaching a first end of the chain or the belt to a first endplate;

attaching a second, opposite end of the chain or the belt to a second endplate;

abutting a bracket guide block directly coupled to a bracket of the second endplate directly against an interior surface of a track within an internal cavity of the track of the movable partition system to impede rotation of the bracket about an adjustment mechanism comprising an elongated rod extending from a surface of the second endplate on a front side thereof and a carriage member mounted on the elongated rod, the bracket being attached to the second, opposite end of the chain or the belt; and manipulating the adjustment mechanism to adjust tension in the chain or the belt, the adjustment mechanism operably coupled with the bracket and located on the front side of the second endplate facing a space to be partitioned by a movable partition of the movable partition system.

18. The method of claim 17, wherein manipulating the adjustment mechanism comprises adjusting a distance separating the bracket and the surface of the second endplate on the front side thereof.

19. The method of claim 18, wherein adjusting the distance separating the bracket and the surface of the second endplate on the front side thereof comprises rotating a threaded nut about a threaded portion of the elongated rod to slide the carriage member longitudinally along the elongated rod.

20. The method of claim 17, wherein manipulating the adjustment mechanism comprises adjusting tension in the chain or the belt between the second, opposite end of the chain or the belt being attached to the bracket located on the front side of the second endplate and the first end of the chain or the belt attached to another bracket located on a front side of the first endplate facing the space to be partitioned.

* * * * *

UNITED STATES PATENT AND TRADEMARK OFFICE
CERTIFICATE OF CORRECTION

PATENT NO. : 10,697,219 B2
APPLICATION NO. : 15/676538
DATED : June 30, 2020
INVENTOR(S) : Saccomanno et al.

Page 1 of 1

It is certified that error appears in the above-identified patent and that said Letters Patent is hereby corrected as shown below:

In the Specification

| | | |
|---|---|---|
| Column 1, | Line 12, | change "Aug. 15, 2017 the" to --Aug. 15, 2017, the-- |
| Column 3, | Line 13, | change "bather" to --barrier-- |

Signed and Sealed this
Eighth Day of September, 2020

Andrei Iancu
*Director of the United States Patent and Trademark Office*